United States Patent
McDonald

(10) Patent No.: US 12,193,415 B2
(45) Date of Patent: Jan. 14, 2025

(54) WATER DISPENSER APPARATUS FOR USE BY POULTRY

(71) Applicant: Tim McDonald, Missouri City, TX (US)

(72) Inventor: Tim McDonald, Missouri City, TX (US)

( * ) Notice: Subject to any disclaimer, the term of this patent is extended or adjusted under 35 U.S.C. 154(b) by 312 days.

(21) Appl. No.: 18/047,205

(22) Filed: Oct. 17, 2022

(65) Prior Publication Data

US 2023/0081220 A1 Mar. 16, 2023

Related U.S. Application Data

(63) Continuation-in-part of application No. 17/545,533, filed on Dec. 8, 2021, which is a continuation-in-part of application No. 16/658,846, filed on Oct. 21, 2019, now Pat. No. 11,744,227, which is a continuation-in-part of application No. 15/951,667, filed on Apr. 12, 2018, now Pat. No. 10,780,462, which is a continuation-in-part of application No. 15/409,058, filed on Jan. 18, 2017, now Pat. No. 11,089,789, which is a continuation-in-part of application No. 14/877,519, filed on Oct. 7, 2015, now Pat. No. 10,456,812, which is a continuation-in-part of application No. 14/812,545, filed on Jul. 29, 2015, now Pat. No. 9,408,412, which is a continuation-in-part of application No. 14/550,195, filed on Nov. 21, 2014, now Pat. No. 9,320,286.

(51) Int. Cl.
*A01K 39/00* (2006.01)
*A01K 39/02* (2006.01)

(52) U.S. Cl.
CPC ................... *A01K 39/0213* (2013.01)

(58) Field of Classification Search
CPC .............. A01K 39/0213; A01K 7/02
USPC ................ 119/72, 72.5, 73, 74, 75
See application file for complete search history.

(56) References Cited

U.S. PATENT DOCUMENTS

| 3,306,262 A | 2/1967 | Hart | |
| 3,481,268 A * | 12/1969 | Szilagyi | B30B 9/3057 53/529 |
| 3,691,997 A * | 9/1972 | Hatch | A01K 7/027 219/214 |

(Continued)

FOREIGN PATENT DOCUMENTS

WO 200208508 A1 1/2012

*Primary Examiner* — Richard T Price, Jr.
(74) *Attorney, Agent, or Firm* — Egbert, McDaniel & Swartz, PLLC

(57) ABSTRACT

A water container for use by poultry has a container with an inlet opening and an outlet opening, a water hose connected to the inlet opening, and a nozzle affixed to the inlet opening. The inlet opening is positioned below the outlet opening. The water hose is adapted to pass fresh water into an interior of the container. The outlet opening is adapted to allow water from the interior of the container to be released outwardly of the container. The nozzle is positioned adjacent to the bottom of the container and adapted to direct an unobstructed pressurized flow of water toward the bottom of the container so as to pressure wash, clean and remove debris from the interior of the container. A nipple is affixed to the container. The nipple is adapted to allow poultry to access water from the interior of the container.

19 Claims, 5 Drawing Sheets

(56) References Cited

U.S. PATENT DOCUMENTS

| | | | | |
|---|---|---|---|---|
| 4,248,176 | A | * | 2/1981 | Kilstofte .................. A01K 7/02 |
| | | | | 119/72 |
| 4,309,962 | A | * | 1/1982 | Boozer .................... A01K 7/00 |
| | | | | 119/74 |
| 4,527,513 | A | | 7/1985 | Hart |
| 4,890,578 | A | | 1/1990 | Rader |
| 5,924,382 | A | * | 7/1999 | Shumaker .............. A01K 39/00 |
| | | | | 119/72 |
| 6,647,922 | B1 | * | 11/2003 | Travis .................. A01K 45/002 |
| | | | | 119/69.5 |
| 6,782,844 | B2 | * | 8/2004 | Winney ................... A01K 7/00 |
| | | | | 119/74 |
| 6,860,230 | B2 | | 3/2005 | Momont |
| 7,267,078 | B2 | * | 9/2007 | Palett ..................... A01K 7/027 |
| | | | | 119/78 |
| 9,226,482 | B2 | | 1/2016 | Caradaropoli |
| 9,232,768 | B2 | * | 1/2016 | Knurr .................... A01K 1/031 |
| 9,609,847 | B2 | * | 4/2017 | Van Der Poel ....... H01M 10/46 |
| 9,874,882 | B2 | * | 1/2018 | Hymes .................... A01K 7/02 |
| 10,349,635 | B2 | * | 7/2019 | Golden ................ F16K 49/005 |
| 10,653,117 | B2 | | 5/2020 | Delman |
| 11,744,227 | B1 | * | 9/2023 | McDonald ............. A22C 17/08 |
| | | | | 134/94.1 |
| 2007/0215056 | A1 | | 9/2007 | Kreger |
| 2014/0261205 | A1 | * | 9/2014 | Herring, II ............... A01K 7/06 |
| | | | | 251/339 |
| 2016/0165857 | A1 | | 6/2016 | Delman |

\* cited by examiner

WATER DISPENSER APPARATUS FOR USE BY POULTRY

CROSS-REFERENCE TO RELATED APPLICATIONS

The present application is a continuation-in-part of U.S. patent application Ser. No. 17/545,533, filed on Dec. 8, 2021 and entitled "Animal Water Dispenser Apparatus", presently pending. U.S. patent application Ser. No. 17/545,533 is a continuation-in-part of U.S. patent application Ser. No. 16/658,846, filed on Oct. 21, 2019, and entitled "Animal Water Dispenser Apparatus and Process for Providing Fresh Water to an Animal", presently pending. U.S. patent application Ser. No. 16/658,846 is a continuation-in-part of U.S. patent application Ser. No. 15/951,667, filed on Apr. 12, 2018, and entitled "Washing Apparatus for Cleaning Game, Fruit, Vegetables, Fish or Crustacea in a Container", now issued as U.S. Pat. No. 10,780,462 on Sep. 22, 2020. U.S. patent application Ser. No. 15/951,667 is a continuation-in-part of U.S. patent application Ser. No. 15/409,058, filed on Jan. 18, 2017, and entitled "Apparatus for Cleaning Crustacea or Game", now issued as U.S. Pat. No. 11,089,789 on Aug. 17, 2021. U.S. patent application Ser. No. 15/409,058 is a continuation-in-part of U.S. patent application Ser. No. 14/877,519, filed on Oct. 7, 2015, and entitled "Apparatus and Method for Washing Meat and/or Produce", now issued as U.S. Pat. No. 10,456,812 on Oct. 29, 2019. U.S. patent application Ser. No. 14/877,519 is a continuation-in-part of U.S. patent application Ser. No. 14/812,545, filed on Jul. 29, 2015, and entitled "Apparatus and Method for Cleaning Produce", now issued as U.S. Pat. No. 9,408,412 on Aug. 9, 2016. U.S. patent application Ser. No. 14/812,545 is a continuation-in-part of U.S. patent application Ser. No. 14/550,195, filed on Nov. 21, 2014, now issued as U.S. Pat. No. 9,320,286 on Apr. 26, 2016.

BACKGROUND OF THE INVENTION

1. Field of the Invention

The present invention relates to the provision of water to poultry. In particular, the present invention relates to water containers that refresh the water and clean the water container.

2. Description of Related Art Including Information Disclosed Under 37 CFR 1.97 and 37 CFR 1.98

It is commonly known among poultry farmers that to increase the growth of birds and therefore the profits of the farmer, the bird should eat as much as possible and as often as possible. It is also known that the more water the birds drink, the more they eat. Accordingly, there are many devices for continuously supplying drinking water to the birds. However, the devices for accomplishing this apparently simple task has not been overwhelmingly successful.

There are many factors that affects consumption of drinking water in a poultry house and which affect the design of systems for providing drinking water. For example, the birds tend to drink more water if the height of the dispenser is properly adjusted in relation to the height of the birds. Another factor which affect the consumption is the temperature of the drinking water. If the water temperature is excessively high, the birds tend to drink less. Furthermore, if the drinking water becomes extremely dirty as a result of the environment the poultry house, the birds are less likely to drink.

An example of a conventional apparatus for providing drinking water to poultry is a self-filling water pan. A self-filling water pan is approximately one to two feet in diameter, about three to five inches deep and suspended from the ceiling of the poultry house. In a typical installation, the poultry house would include a row of such pans extending the length of the house in spaced apart along the row to about six to twelve feet. The water is conducted along the pipes in the overhead portions of the poultry house and is carried down to the pans by a hose. The hose is provided with a weight-sensitive valve to provide water when the pan becomes light (from the water being consumed by the birds) and to stop the flow when the pan is full so as not to overflow onto the floor of the poultry house.

The self-filling water pan, however, suffers many drawbacks. In particular, the water supply is in the upper portion of the poultry house where the heat is trapped in the summertime. This causes the drinking water to get extremely warm. This occurs in spite of the fact that the water is typically supplied from an underground well at about 55° F. Secondly, since it is desirable to adjust the height of the pans as the birds grow, each pan must be adjusted individually. This is a tedious and time-consuming task, particularly in view of the number of pans in a typical poultry house. A further drawback of the self-filling pans is that the standing water therein is conducive to the growth of germs, bacteria and other undesirable elements. Moreover, once the germs and bacteria are established in the pans, the pans provide an excellent means for communicating the germs and bacteria to all the birds of the flock. While it is conventional to clean and disinfect the watering apparatus between broods, while performing other poultry house maintenance, it is impractical to clean the pans during the raising of a brood except in the most extreme circumstances.

In the past, various patents have issued relating to water dispenser apparatus for poultry. For example, an early patent is that of U.S. Pat. No. 3,306,262, issued on Feb. 28, 1967 to H. W. Hart. This patent describes a watering system for poultry in which a supply of water is provided having a variable pressure in accordance with the age of the poultry to provide an increase in water pressure as the age of the fowl increases. A watering cup is provided. A valve is placed between the supply of water and the watering cup to obtain a controlled introduction of water from the supply of water to the watering cup. A control member is provided in the watering cup. The control member has characteristics of floating on the water and actuatable by the fowl to obtain an operation of the valve for controlled introduction of water to the watering cup in accordance with the variable pressure of the water in accordance with the characteristics of the control member.

U.S. Pat. No. 3,306,262, issued on Feb. 28, 1967 to H. W. Hart, describes a poultry watering device that has a compact structure comprising an array of substantially horizontal conduits for connection to a water source. Drinking cups are connected to the outlets to cooperate with the conduit structure to form an assembly to rest on a floor for supplying water to young fowls. A suspension means having wire-like members above the assembly suspends the assembly above the floor for older fowls. These wire-like members extend diagonally downwardly to regions of the respective cups to prevent birds from perching on the conduit structure adjacent to the cups. The wire-like members of the suspension at least partially overhang the water outlets to prevent birds from perching on the water outlets.

U.S. Pat. No. 4,527,513, issued on Jul. 6, 1985 teaches a poultry water that includes a support tube, at least water-holding cup disposed for access by poultry, and a water conduit carried by the support tube and extending from a water line to the water-holding cup. The system includes a plurality of discrete feeder pan units connected to the feed conveyor and disposed to present feed to the poultry. The water line is located generally adjacent to the feed conveyor. A number of water dispensing stations are provided. These water dispensing stations have support tubes or clamps carried by the feeder conveyor. In this manner, the water dispensing stations and feed pan units are all disposed at the same level.

U.S. Pat. No. 4,890,578, issued on Jan. 2, 1990 to H. Rader, shows a poultry nipple drinker. This nipple drinker has a body composed of a thermoplastic acetyl that minimizes the amount of metal utilized. The drinker includes a valve seat, a valve pin and a ball. The head of the valve pin is essentially flat.

U.S. Pat. No. 5,025,754, issued on Jun. 25, 1991 to D. Plyler, discloses an apparatus and method for providing drinking water to poultry that utilizes gravity feed to distribute water from the reservoir through to a conduit to a series of water cups connected to the conduit in open communication with the conduit and extending upwardly therefrom. The conduit and reservoir are suspended above the floor of the poultry house by cables depending downwardly from overhead portions of the poultry house and connected to a winch so as to be easily raised to a suitable height to accommodate growth of the poultry. The system includes an arrangement for periodically purging and cleaning the system by replacing the drinking water with liquid disinfectant for a predetermined dwell time.

U.S. Pat. No. 6,860,230, issued on Mar. 1, 2005 to Momont et al., shows a stem for a watering nipple for use in supplying water to poultry. At least a portion of the stem is hollow and formed of a coiled material in a manner similar to that of a coiled spring such that the stem has a number of turns and minuscule gaps provided between adjacent turns. Upon actuation of the nipple, a water-tight seal is broken such that a portion of the water is directed to flow through the hollow interior of the stem. It is then directed into the mouth of the poultry.

U.S. Pat. No. 9,226,482, issued on Jan. 5, 2016 to F. R. Caradaropoli, teaches an apparatus for providing fresh water to fowl. The article comprises a valve which is adapted to be attached to a bottle. The valve is adapted to be attached to the bottle by a female connection adapter. The valve comprises a valve body and an actuating mechanism comprising an actuating pin, a receiving pin and a ball.

U.S. Pat. No. 10,653,117, issued on May 19, 2020 to H. M. Delman, shows a portable animal waterer that includes a bulbous manifold formed from a manifold wall, a connector formed from an extension of the bulbous manifold, a first valve hole on the bulbous manifold in the manifold wall and a second valve hole on the bulbous manifold in the manifold wall substantially opposite to the first valve hole. The first valve hole is configured to receive a first valve. The second valve hole is configured to receive a second valve.

U.S. Patent Application Publication No. 2007/0215056, published on Sep. 20, 2007 to Kreger et al. describes a watering system for turkeys that includes a channel assembly and a pipe assembly covered and supported by the channel assembly. A hanger is wrapped around the channel assembly and the pipe assembly and is secured to itself above the channel assembly. The hanger is secured to an assembly for raising and lowering the watering system. The hanger is also wrapped around and secured around a previously installed anti-roost wire. Nipple assemblies are connected to the pipe assembly and provide the turkeys with access to the water within the pipe assembly when the birds trigger the nipple assemblies. Catch cup assemblies are secured to the channel assembly and have first and second catch basins. The first catch basin is provided below one of the nipple assemblies. The second catch basin is provided below an adjacent nipple assembly.

U.S. Patent Application Publication No. 2016/0165857, published on Jun. 16, 2016 to H. M. Delman, shows a portable nipple-based poultry waterer. This waterer is provided having a manifold with a connector placed on the back surface to attach the manifold to a water storage vessel. The connector extends outward in a substantially perpendicular fashion to the manifold. Holes are placed into the manifold to accept a plurality of longitudinally-spaced poultry nipples.

It is an object of the present invention to provide a water dispenser for poultry that allows clean fresh water to be delivered to the poultry.

It is another object of the present invention to provide a water dispenser for poultry that pressure washes, cleans and removes dirt and debris from the interior of the container.

It is another object of the present invention to provide a water dispenser for poultry that provides an unlimited supply of water to the poultry.

It is another object of the present invention to provide a water dispenser for poultry which is easy to use, easy to manufacture and relatively inexpensive.

It is still another object of the present invention to provide a water dispenser for poultry which automatically removes insect larvae from the surface of the water and prevents insect infestation.

It is another object of the present invention to provide a water dispenser for poultry which can be used by both adult poultry and chicks.

These and other objects and advantages of the present invention will become apparent from a reading of the attached specification and appended claims.

BRIEF SUMMARY OF THE INVENTION

The present invention is a water container for use by poultry that has a container with an inlet opening and an outlet opening, a water hose connected to the inlet opening, a nozzle affixed to the inlet opening, and a nipple affixed to the container. The inlet opening is positioned below the outlet opening. The water hose is adapted to pass fresh water into the interior of the container. The outlet opening is adapted to allow water from the interior of the container to be released outwardly of the container. The nozzle is positioned adjacent to the bottom of the container. The nozzle is adapted to direct an unobstructed pressurized flow of water toward the bottom of the container so as to pressure wash, clean and remove debris from the interior of the container. The nipple is adapted to allow poultry to access water from the interior of the container.

In the present invention, the nozzle has a reduced diameter discharge port adapted to pressurize the flow of water from the inlet opening. The reduced diameter discharge port has a stadium shape. The stadium shape has an upper side and a lower side. The lower side extends generally parallel to the bottom of the container. The reduced diameter discharge port is positioned in the interior of the container. This reduced diameter discharge port of the nozzle can also be formed in the wall of the container. The pressurized flow of water is in a bottom-to-top-toward the bottom circular pattern.

The nipple is positioned on the container in a location between the inlet opening and the bottom of the outlet opening. The nipple comprises a plurality of nipples arranged circumferentially around in exterior of the container. In particular, the nipple comprises a valve seat, a stem extending through the valve seat so as to have an end position outwardly of the valve seat, and a valve cap affixed to the valve seat. The valve cap has a diaphragm therein. An opposite end of the stem bears against the diaphragm such that when the end of the stem is contacted by a beak of a poultry, the diaphragm is moved so as to release water through the valve cap and outwardly of the valve seat.

A fresh water source is connected to the water hose. The fresh water source is adapted to pass fresh water under pressure through the water hose. The inlet opening has a portion extending outwardly of the exterior of the container. The portion of the inlet opening has a connection for the water hose at an outer end thereof.

In the preferred embodiment of the present invention, the container is a bucket. The bucket has a handle mounted at or adjacent to a top thereof. The handle is movable between an extended position and a retracted position. The outlet opening has a portion extending outwardly of the container and located at or adjacent to a top of the container. A drain hose is connected to the portion of the outlet opening. The drain hose is adapted to pass the water from the container toward a desired drain area.

This foregoing Section is intended to describe, with particularity, the preferred embodiments of the present invention. It is understood that modifications to the preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
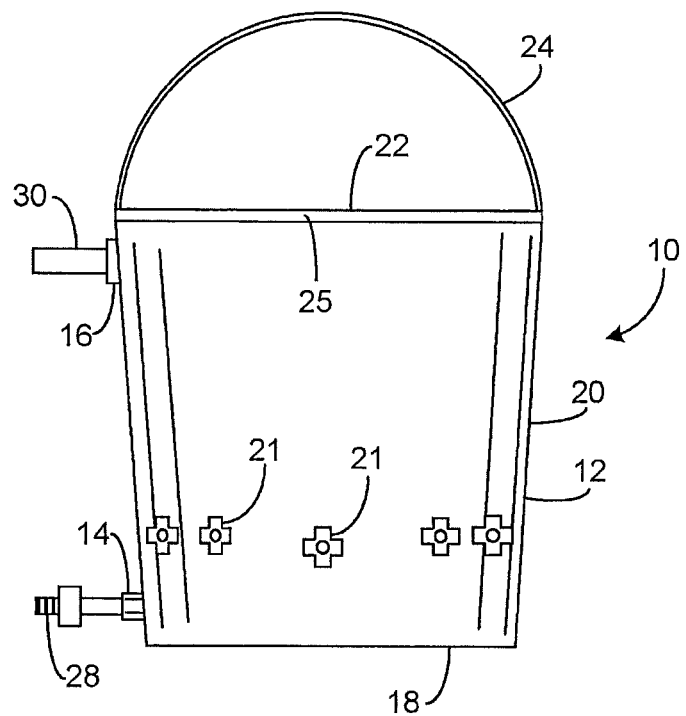
FIG. 1 is a side elevational view showing the water dispenser apparatus for poultry in accordance with the present invention.

Referring to FIG. 1, the water dispenser apparatus 10 for poultry is illustrated. The water dispenser apparatus 10 has a container 12 with an inlet opening 14 and an outlet opening 16. The inlet opening 14 is positioned below the outlet opening 16.

The container 12 is in the nature of a water bucket. The container 12 has a bottom 18 and a wall 20. The wall 20 tapers upwardly and outwardly from the bottom 18 so as to have an open top. There is a lip 25 that extends outwardly and downwardly from the top 22 of the container 12. The container 12 can be made of a polymeric material. A handle 24 is pivotally mounted at the top 22 of the container 12. In FIG. 1, the handle 24 is illustrated in an extended position.

The container 12 will contain a relatively large amount of water, such as a five gallon bucket. It is possible, within the concept of the present invention, that the container can be in the nature of the trough. The container 12 can be made of any material. In particular, the bucket can be of a polymeric material or it can be of a metallic and/or stainless steel material.

Importantly, there are a plurality of nipples 21 that are affixed to the container 12 in a location above the bottom 18 of the container 12. Nipples 21 are configured so as to allow a poultry to access water from the interior of the container 12. The nature of the nipples 21 is shown hereinafter in connection with FIGS. 7-10. The nipples 21 are, in the preferred embodiment the present invention, are positioned on the container 12 in a location between the inlet opening 14 and a bottom of the outlet opening 16. In other embodiments, the nipples 21 can be located at the bottom 18 of the container and face downwardly for access by smaller chicks. The plurality of nipples 21 are arranged circumferentially around the exterior of the container 12.

When a poultry desires to receive water from the container 12, the poultry could simply reach over the top 22 of the container 12 in order to drink water. For example, if a full-sized rooster or hen desires to drink water from the container 12, this full-sized rooster or hen may simply reach over the top 22 of the container and take in water from the interior of the container. Smaller animals, such as chicks, can manipulate the nipples 21 in order to access water at a from a lower position on the container or from the bottom of the container. As such, the container 12 is adaptable for providing water to both chicks and full-sized poultry.

The handle 24 can make container 12 virtually spill-proof. Handle 24 can be draped over a fence post or other exterior objects so as to fix the position of the container 12. In other circumstances, the handle 24 can be draped over another object so as to fix the position of the container 12.

The container 12 is continuously refreshed with clean and cool water. As such, the inlet opening 14 is configured so as to introduce water into the interior of the container 12. The inlet opening 14 has a portion that extends outwardly of an exterior of the container 12. This portion has a connection 28 suitable for connection to a water hose. As such, the water hose can be joined to the connection so as to deliver water, under pressure, into the interior of the container. The inlet opening 24 can include a nozzle positioned within the interior of the container. The nozzle is connected to the inlet opening in order to deliver water from the inlet opening into the interior of the container so as to pressure wash, clean and remove debris from the interior of the container.

As will be described in connection with FIGS. 3-6, the nozzle can have a reduced diameter discharge port. This discharge port has a stadium shape. The stadium shape is defined as a pair of parallel straight sides with semicircular or curved ends joining the parallel sides. This configuration directs water from the water hose toward the bottom of the container and toward the side walls of the container so as to pressure wash, clean and remove dirt, debris and algae from the bottom of the container and from the sides of the container. This is quite important when feeding poultry since a poultry house is notoriously unsanitary and filled with floating debris, dust, fecal matter, and other contaminating materials. Ultimately, the circular pattern will discharge water, along with the dirt, debris and algae, outwardly of the outlet opening 16. This type of nozzle emits a fan-style spray of water in a direction toward the side walls of the container 12 away from the inlet opening.

Eventually, as water fills the container, it will reach a level equal to that of the outlet opening 16. The outlet opening 16 has a portion 30 that extends outwardly of the exterior of the container 12. As such, when water reaches the level of the outlet opening 16, water will flow outwardly of the container through portion 30. Ultimately, portion 30 can be connected to a drain hose so as to allow water from the interior of the container 12 to be drained to a remote location away from the container 12. The outlet opening 16 can also be the top of the container 12. When water reaches the top of the container 12, water and debris will flow outwardly over the lip 25 of the upper edge of the container. Water will spill toward areas exterior of and adjacent to the container. A drain pan can be placed below the container so as to collect any water and debris which has flowed over the upper edge of the container.

The configuration of the present invention allows the water dispenser apparatus to be self-cleaning. The high-pressure release of water through the nozzle at the inlet opening 14 provides a strong force in which dirt, debris and algae are forced off the bottom and sides of the container. The intermittent introduction of the water through the inlet opening will keep the water fresh. The fan of water from the nozzle pressure washes the bottom of the container. This bottom-to-top-toward the bottom circular flow pattern enhances the discharge of water and debris through the outlet opening 16. It also serves to keep the debris in suspension. Since the nozzle limits the discharge of water to approximately four gallons per minute, the present invention unexpectedly conserves water. If a garden hose were used, the discharge rate of water from the garden hose would be approximately twelve gallons per minute. The restriction of water through the hose serves to prevent an excessive amount of water from being used. As such, the present invention effectively utilizes the water that is available in an efficient and effective manner.

Figure 2:
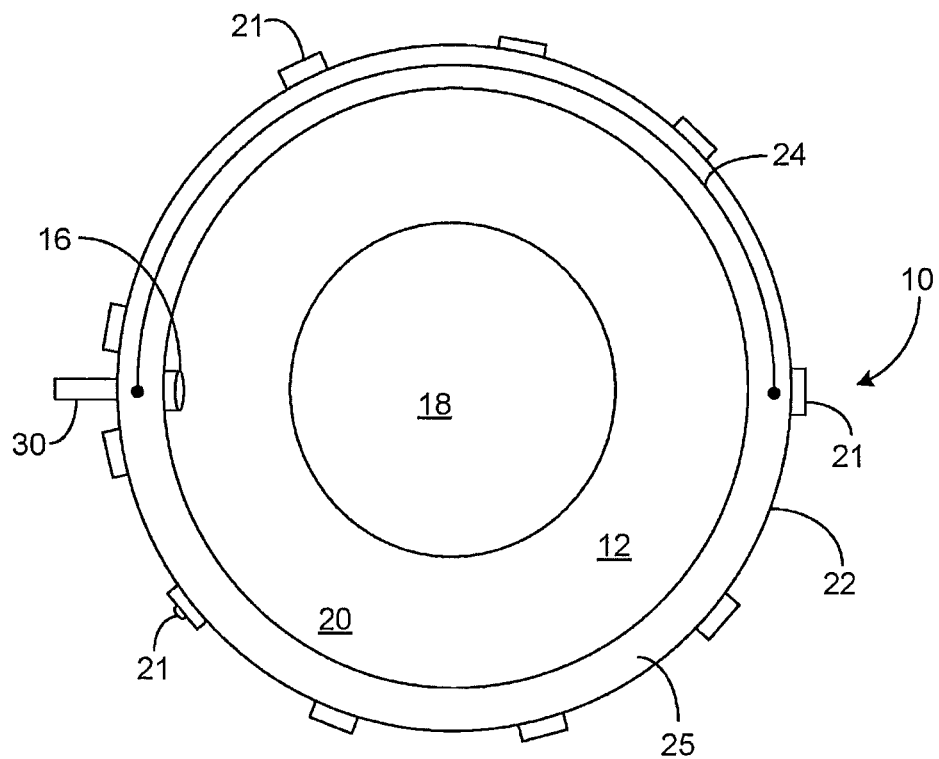
FIG. 2 is a plan view of the water dispenser apparatus for poultry of the present invention.

FIG. 2 shows the top of the animal water dispenser apparatus 10 of the present invention. As can be seen, the container 12 has a bottom 18, a wall 20 and a top 22. Handle 24 is pivotally mounted to the top 22. FIG. 2 shows the handle 24 in its retracted position. The inlet opening 14 is located adjacent to the bottom 18 of the container 12. The outlet opening 16 is located adjacent to the top of the container 12. The outlet opening 16 is shown as having portion 30 extending outwardly of the exterior of the container 12.

The handle 24 can be moved to the retracted position overlying the lip 25 of container 12. This allows easier access by poultry to the water on the inside of the container 12. It will be appreciated that the present invention avoids potential spillage. Initially, the container 12 can be transported to a desired location by using the handle 24 in its extended position. Once the container 12 reaches its intended destination, the handle 24 can be lowered. It is not necessary to carry water from the water source to a remote location (thus creating potential spillage). After the empty container 12 reaches its intended destination, a water source can be actuated so that water will flow through the inlet opening 14 and fill the container 12. It is not necessary to move the container to any other location, unless desired. Also, it will be appreciated that the container 12 has a relatively light weight not filled with water. As such, even children can move the container to a desired location since the container is not filled with water when initially deployed. The container only becomes have a once water is introduced into the interior of the container. The now-heavy weight of the container (when filled with water) will provide stability to the container throughout water consumption by the poultry. In the present invention, the interior of the container 12 is always filled with water, consumption of the water by the poultry will not reduce the weight of the filled container such that the filled container always provides stability when the poultry drinks the water.

In FIG. 2, it can be seen that the nipples 21 have a portion extending outwardly of the exterior of the container 12. In particular, as will be described hereinafter, each of the nipples 21 includes a small stem that can be accessed by the beak of the poultry. When the stem is manipulated, it will open a valve so that the small amount of water will pass through the nipple 21 and toward the mouth of the poultry. The nipples 21 are arranged circumferentially around the exterior of the container 12. As such, there is a large amount of space for a number of poultry to access the water within the container. Importantly, in the present invention, since the water within the container is fresh and clean, more water will be consumed by the poultry. This leads to the better development of chicks and greater weight in the adult poultry. The larger poultry can simply access the water in the interior of the container 12 by reaching over the top of the container 12.

Figure 3:
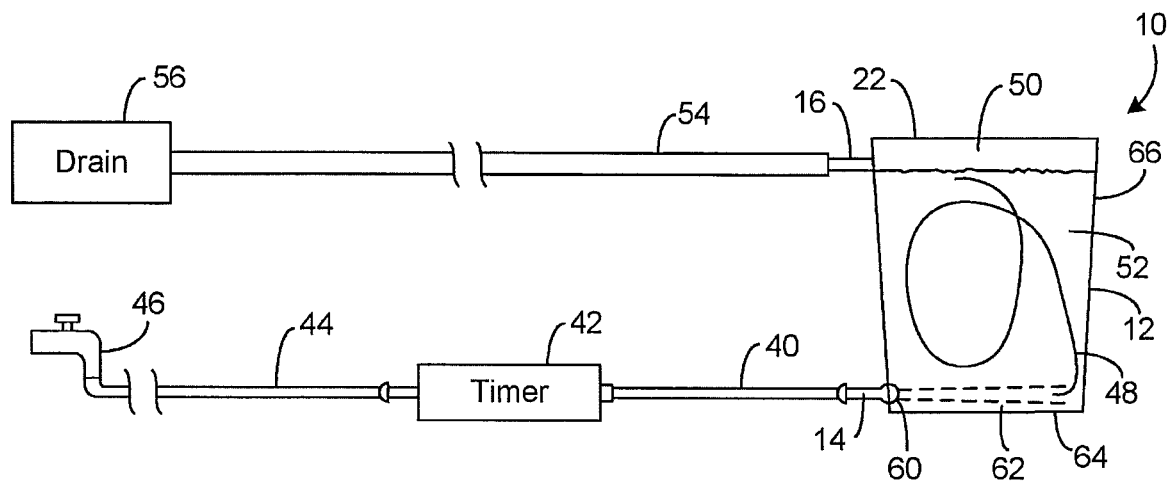
FIG. 3 is a diagrammatic illustration of the process of the present invention in which debris is removed from the bottom and side walls of the container and discharged out of the outlet opening of the container.

FIG. 3 shows the water dispenser apparatus 10 as used in a water system. Initially, it can be seen that the water inlet 14 is connected to one end of a first hose 40. An opposite end of the first hose 40 is connected to a timer 42. A second hose 44 is connected to a water source 46. The timer 42 is in the nature of a conventional sprinkler timer. The timer can be set to times and water will flow from the water source 46 through the second hose 44, through the first hose 40 and into the interior 48 of the container 12. The timer 42 can set the time of activation and the duration of activation. As such, it is believed that is necessary to provide cool fresh water to the poultry for six times per day, the timer can be set to allow water flow at six evenly spaced periods of time during the day. The timer can also be set so as to assure that water will flow for a desired period of time (such as three minutes). This will assure that the interior 48 of the container 12 is suitably filled with water so that the top level 50 of the water 52 in the interior 48 of container 12 reaches the outlet opening 16. Since water is continuously discharged through the outlet opening 16, the duration of water flow does not need to be accurately set. If the duration is over an extended period of time, the water will simply flow out of the outlet opening so that the container 12 is continuously filled with water.

As can be seen in FIG. 3, the water source 46 is in the nature of a faucet. An end of the second hose 44 is attached to the faucet 46 so that water flows, under pressure, through the second hose 44 and toward the timer 42. When the timer 42 is off, water is prevented from flowing into the first hose 40. When the timer 42 is on, the water will flow under pressure through the second hose 44, through the first hose 40 and into the inlet opening 14 of the container 12. Eventually, water will continue to flow until the level 50 of the water 52 reaches the outlet opening 16. At that time, water 52 will be discharged through the outlet opening 16.

FIG. 3 shows that there is a nozzle 60 affixed to the inlet opening 14. Nozzle 60 is in the nature of a reduced-diameter discharge port at an end opposite the inlet opening 14. Lines 62 illustrate the pattern of the flow of water released through the nozzle 16 into the interior of the container. As can be seen, the water (as evidenced by lines 62) is initially directed toward the bottom 64 of the container 12. After the water encounters the bottom and the side wall 66 of the container 12, it will flow upwardly in a bottom-to-top-toward bottom flow pattern. This circular flow pattern serves to keep any particles, dirt and debris in suspension in the water. Ultimately, the circular flow pattern urges such particles, dirt and debris outwardly through the outlet opening 16. In the meantime, the strong flow of water, in this pattern, serves to pressure wash, clean and remove particles from the bottom 64 and side wall 66 of the container 12. This effectively cleans the interior of the container 12. Any debris within the interior 48 of container 12 will generally float in the water. The dirt and debris will be at the top level of the water 52. The dirt and debris is discharged, along with the water, through the outlet opening 16. As such, even though the poultry cause dirt and debris to enter the container, this debris is continuously flushed. The poultry will only be presented with clean and fresh water. The container 12 will remain generally dirt free.

In certain areas of the country, insect and mosquito larvae will be deposited by insects onto the surface of the water within the container 12. In the past, the poultry would be consuming this larvae and can be possibly poisoned by the consumption of such larvae. In other circumstances, in conventional water containers and bowls, the larvae will eventually hatch into insects. The particular insects that may hatch from the larvae on the water will occupy a space adjacent to the container. There is potential for stinging injuries to the poultry by virtue of the proximity of the insects. It has been found that certain mosquitoes can be potentially lethal to poultry. It is important to avoid the accumulation of larvae and the associated hatched insects in proximity to the container. By virtue of the continuous flushing provided by the present invention, any larvae that is deposited onto the surface of the water within the container will eventually flow through the outlet opening 16 and away from the container. Ultimately, if a drain hose is connected to the outlet opening, the potentially dangerous larvae can be delivered to a remote location for disposal.

The outlet opening 16 is located generally adjacent to the top 22 of container 12. The outlet opening 16 is shown as located directly above the inlet opening 14. However, the outlet opening 16 can be located in another location around the outer diameter of the container 12. The outlet opening 16 can be slightly greater than the inlet opening 14 so that dirt, debris, larvae and other objects that float on the surface of the water 52 can be discharged outwardly of the container 12. A drain hose 54 is connected to the outlet opening 16. Drain hose 54 can be extended to any drain location 56, such as a sewer system or drainfield. If desired, the drain location 56 can be an area of the earth away from the container 12. In other circumstances, if desired, the drain location 56 can be a creek, a pond, or other body of water. In still other circumstances, if a sink is located near the container 12, the drain hose 54 can be extended so that the discharged water from the interior of the container 12 will pass into the drain of the sink. The previous embodiments, the container was in the nature of a bucket. Importantly, within the present invention, the container can be of various other configurations.

Figure 4:
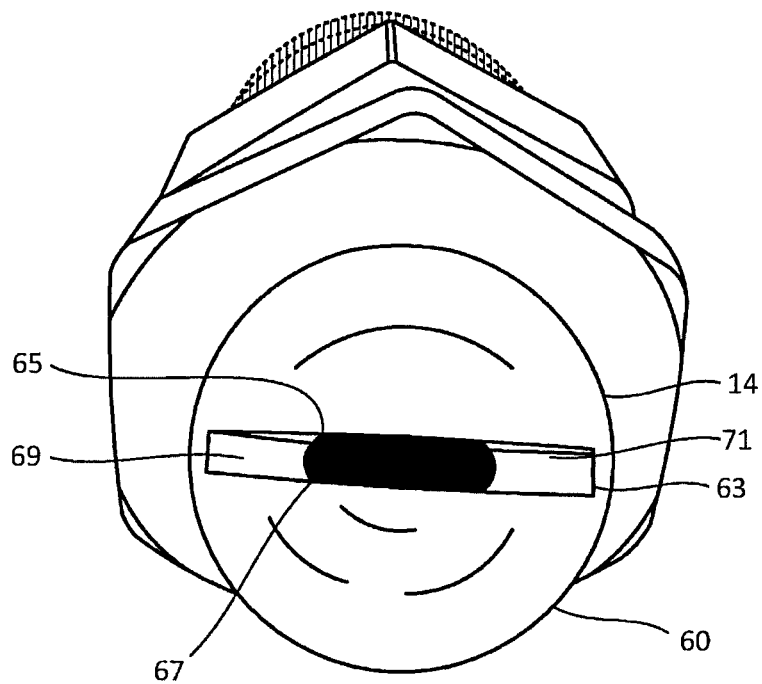
FIG. 4 is an end view showing the discharge port of the nozzle as positioned within the interior of the container of the present invention.

FIG. 4 shows, in particular, the nozzle 60 that is formed at the end of the fluid inlet 14. The nozzle 60 has a slot 63 having a generally stadium shape. This "stadium shape" has a pair of parallel straight sides 65 and 67 with straight or curved ends 69 and 71 connecting the straight sides 65 and 67. Nozzle 60 will be positioned in the interior of the container. The bottom side 67 will extend parallel to the bottom 64 of the container 12. The length dimensions of the sides 65 and 67 are substantially greater than the length dimensions of the ends 69 and 71. The nozzle 60 is adapted to direct a pressurized flow of water adjacent to the bottom 64 of the container 12. The end of the nozzle 60 can be suitably curved such that the discharge port 63 is also curved so as to be formed on the contour of the curved end of the nozzle 60.

Figure 5:
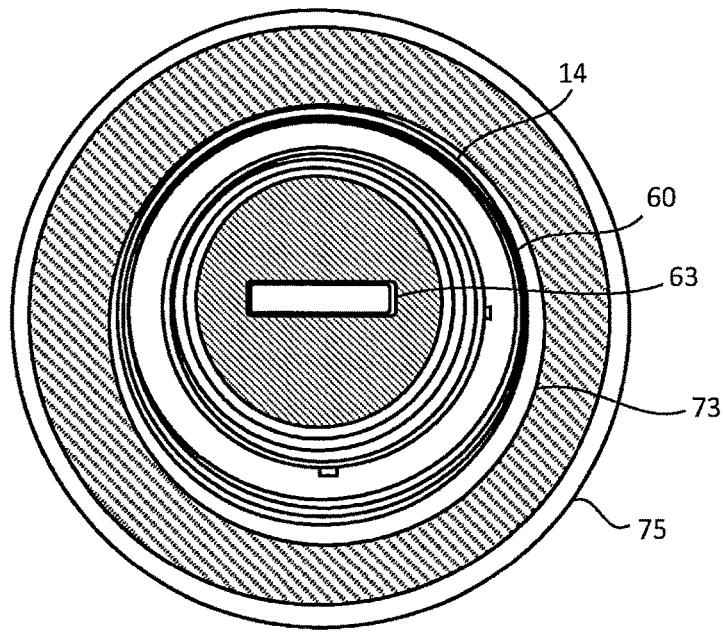
FIG. 5 is an opposite end view of the nozzle and inlet opening to the present invention.

FIG. 5 shows an exterior view of the fluid inlet 14 and in particular, the nozzle 60 that is formed at the end of the inlet opening 14. A hose connection 73 will be located exterior of the wall 75 of the container 12. The inlet opening 73 will have threads that will engage with the threads at the end of the water hose (in the manner described herein previously). FIG. 5 shows that the nozzle 60 has a reduced diameter discharge port 63. This "reduced diameter" discharge port means that the total area of the opening of the discharge port 63 will be less than the area of the end of the water hose (received in the threaded connection 63) or the inner diameter of the inlet opening 60. As such, the discharge port 63 will emit a strong pressurized flow of water therethrough.

Experiments with this configuration of nozzle have shown that it creates a strong laminar flow of water in a straight direction adjacent to the bottom 64 of the container 12. The stadium shape of the nozzle 60 creates a strong flow that tends to spread slightly upwardly from the bottom 64 of the container 12. As such, these flows of water tend interact with the dirt and debris so as to pressure wash, clean and forcibly remove the dirt and debris from the surfaces of the container 12. This configuration of slot also creates the bottom-to-top-toward bottom flow pattern of water within the interior 52 of the container 12.

Figure 6:
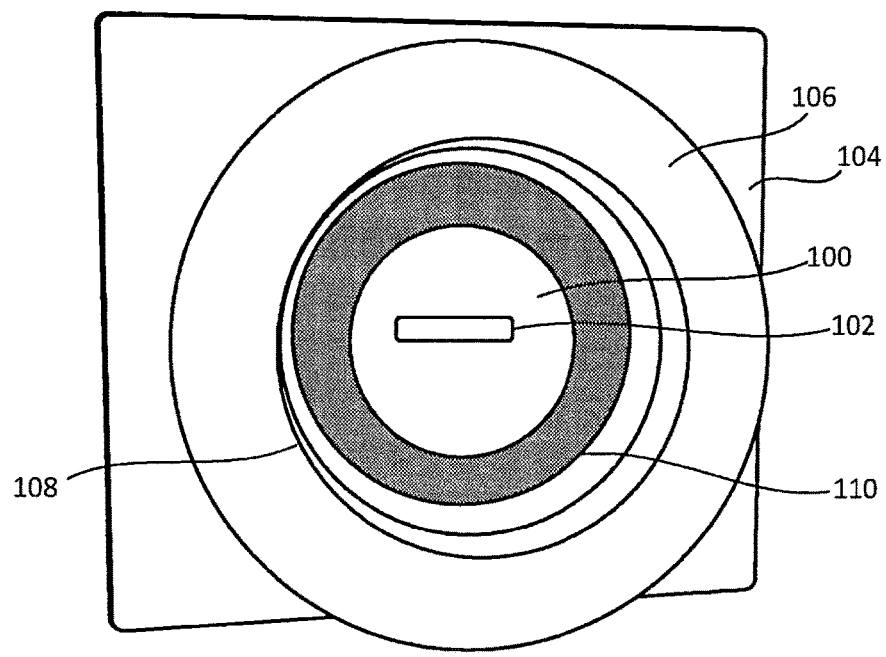
FIG. 6 is an end view as taken from the exterior of the container of an alternative embodiment of the nozzle and discharge port of the present invention.

FIG. 6 shows an alternative embodiment of the nozzle 100. Nozzle 100 is actually a slot 102 that is formed in the wall 104 of the container. As such, the slot 102 is not located in the interior of the container but simply on the wall of the container. The inlet opening 106 will have a molded threaded connection 108 that is adapted to receive the threaded connection of a water hose therein. A gasket 110 establishes a liquid-tight seal between the garden hose and the interior of the inlet opening 106.

As with the previous embodiment, shown in FIGS. 4 and 5, the slot 102 has a stadium shape. Since this slot 102 is actually formed directly on the wall 104 of the container, this reduces the number of items that are required for the assembly and construction of the present invention and, as such, reduces the cost of the present invention. It is believed that this configuration of the nozzle 100 will have the same effect as the nozzle positioned directly within the interior of the container. Furthermore, by forming the slot 102 in the wall 104 of the container, there are no obstructions in the interior of the container that could impede or otherwise interfere with a desired flow pattern of water on the interior of the container.

Figure 7:
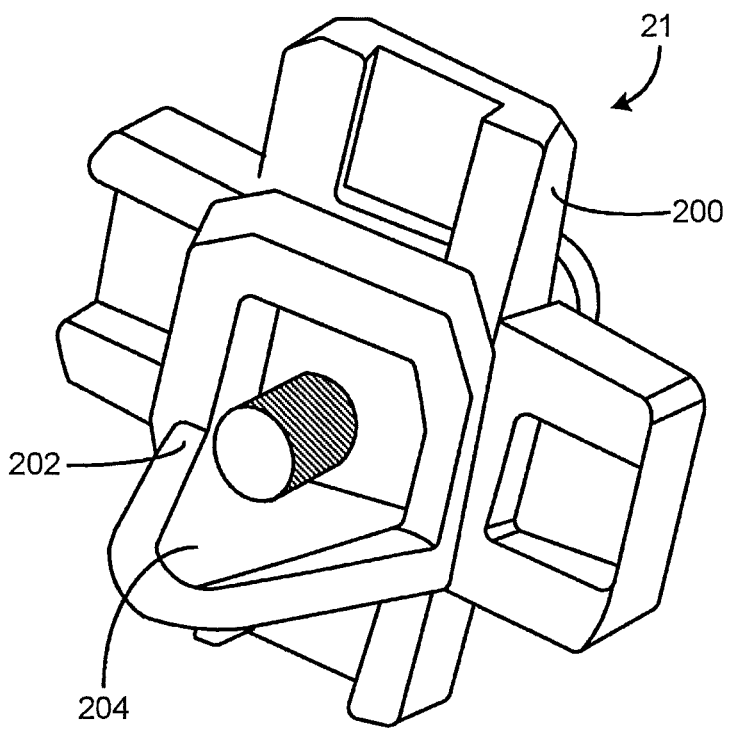
FIG. 7 is a perspective view of one type of nipple as used in the water dispenser apparatus for poultry of the present invention.

FIG. 7 shows one type of nipple 21 that can be used in the present invention. In FIG. 7, the nipple 21 has a housing 200 that is adapted to be affixed to the surface of the container 12. Stem 202 extends outwardly of the housing 200. A small trough 204 is located below the stem 202. When the chick or poultry pecks at the stem 202, this will activate a diaphragm (to be described hereinafter) so as to release water outwardly of the housing 200. Ultimately, water can accumulate within the trough 204 in order to be consumed by the poultry.

Figure 8:
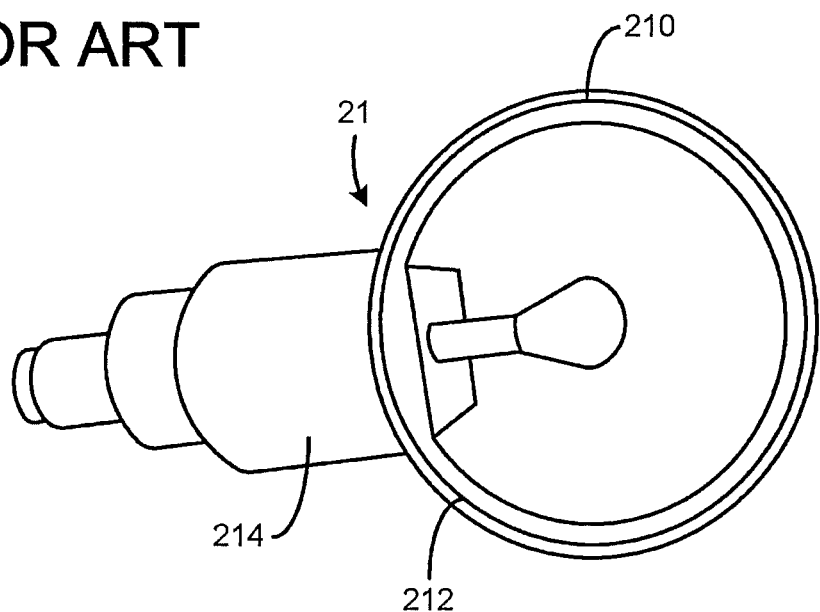
FIG. 8 is a plan view of an alternative nipple as used for the water dispenser apparatus for poultry of the present invention.

FIG. 8 shows another type of nipple 21. In this embodiment, there is a bowl 210 located below a stem 212. As such, when the stem 212 is pecked at, water will be released from the valve body 214 and flow into the bowl 210. Once again, the poultry can drink the water as it flows out of the valve body 214 or after it has flowed into the bowl 210.

Figure 9:
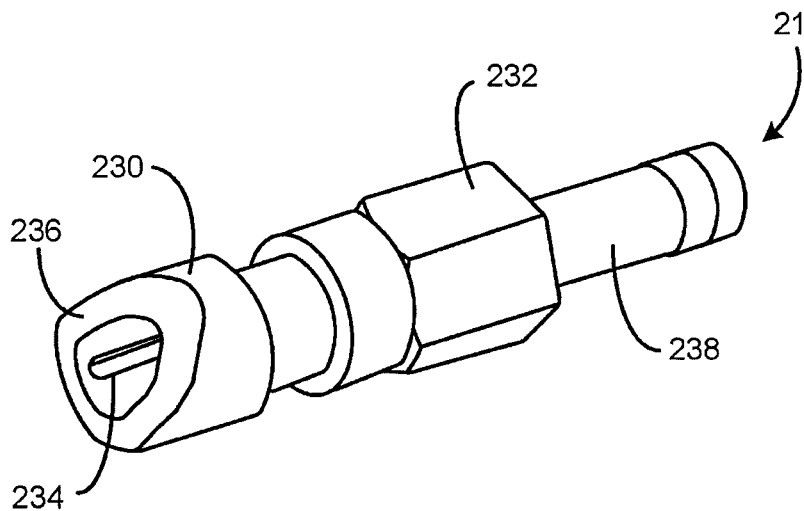
FIG. 9 is a perspective view of the nipple as used in the water dispenser apparatus for poultry of the present invention.

FIG. 9 shows the configuration of the nipple 21 as used in the present invention. Initially, a valve seat 230 is located at one end of the nipple 21. A valve cap 232 is located at the opposite end of the nipple 21. The stem 234 will extend outwardly of an opening 236 of the valve seat 230. The tubular member 238 of the valve cap 232 will extend into the interior of the container 12. As such, water will flow into the tubular member 238 of the valve 232. A diaphragm, positioned within the interior of the valve cap 232, will operate so as to selectively release water outwardly of the opening 236 of the valve seat 230 upon movement of the stem 234.

Figure 10:
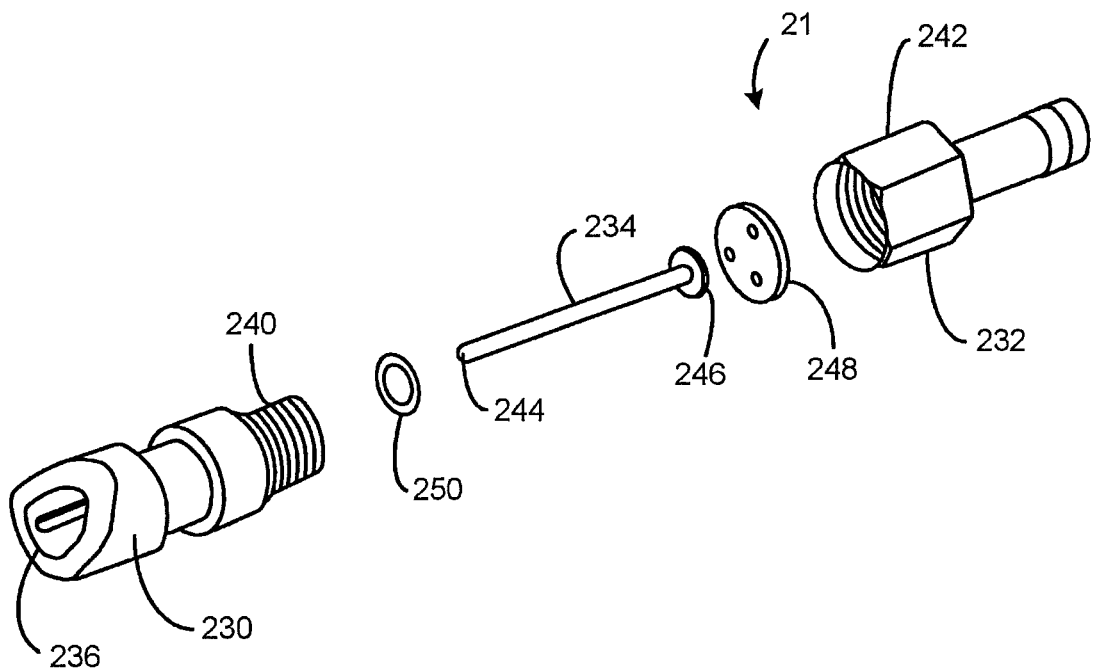
FIG. 10 is an exploded view of the nipple of the water dispenser apparatus for poultry of the present invention.

FIG. 10 shows an exploded view of the nipple 21 of the present invention. In this exploded view, the valve seat 230 has a threaded section 240 which can be threadedly affixed within the internally threaded portion 242 of the valve cap 232. The stem 234 is an elongated member having a first end 244 and a widened second end 246. The end 244 will extend outwardly of the opening 236 of the valve seat 230. The end 246 will bear against a diaphragm 248 located within the internally threaded portion 242 of the valve cap 232. An O-ring 250 will be located in the interior of the valve seat 230. When movement is applied to the end 244 of the stem, this movement will move the diaphragm 248 so as to release water from the interior of the valve cap 242. As such, water can flow out of the opening 236 of the valve seat 230 and into a cup or bowl located therebelow for consumption by the poultry.

In the present invention, the poultry is continuously supplied with fresh water. As such, during hot temperatures, the poultry will know that fresh, clean, and cool water will be provided at the location of the container 12. The poultry will not be discouraged from drinking the water because of the hot temperature of the water. Additionally, a potential illness to the poultry is avoided because of the water is continuously cleaned. The present invention utilizes the hydrostatic qualities of water so as to pressure wash, clean and remove the dirt and debris from the container.

The foregoing disclosure and description of the invention is illustrative and explanatory thereof. Various changes in the details of the illustrated construction or the steps of the described method can be made within the scope of the appended claims without departing from the true spirit of the invention. The present invention should only be limited by the following claims and their legal equivalents.

I claim:

1. A water container for use by poultry, the water container comprising:
    a container having an inlet opening an outlet opening, the inlet opening positioned at a level below a level of the outlet opening;
    a water hose connected to the inlet opening, said water hose being adapted to pass fresh water into an interior of said container, the outlet opening adapted to allow water from the interior of the container to be released outwardly of said container;
    a nozzle affixed to the inlet opening, said nozzle positioned adjacent the bottom of said container, said nozzle adapted to direct an unobstructed pressurized flow of water toward the bottom of said container so as to pressure wash, clean and remove debris from the interior of said container; and
    a nipple affixed to said container, said nipple adapted to allow poultry to access water from the interior of said container.

2. The water container of claim 1, said nozzle having a reduced diameter discharge port adapted to pressurize the flow of water from the inlet opening.

3. The water container of claim 2, the reduced diameter discharge port having a stadium shape.

4. The water container of claim 3, the stadium shape having an upper side and a lower side, the lower side extending generally parallel to the bottom of said container.

5. The water container of claim 3, the reduced diameter discharge port positioned in the interior of said container.

6. The water container of claim 2, the reduced diameter discharge port of said nozzle being formed in a wall of said container.

7. The water container of claim 1, the pressurized flow of water being in a bottom-to-top-toward bottom circular pattern.

8. The water container of claim 1, said nipple positioned on said container in a location between the inlet opening and the bottom of the outlet opening.

9. The water container of claim 8, said nipple comprising a plurality of nipples arranged circumferentially around an exterior of said container.

10. The water container of claim 1, said nipple comprising:
    a valve seat;
    a stem extending through said valve seat so as to have a portion extending outwardly of said valve seat; and
    a valve cap affixed to said valve seat, said valve cap having a diaphragm therein, an opposite end of said stem bearing against the diaphragm such that when the end of said stem is contacted by a beak of a poultry, the diaphragm is moved so as to release water through the valve cap and outwardly of said valve seat.

11. The water container of claim 1, further comprising:
    a fresh water source connected to said water hose, said fresh water source adapted to pass fresh water under pressure through said water hose.

12. The water container of claim 1, said inlet opening having a portion extending outwardly of an exterior of said container, the portion of the inlet opening having a connection for said water hose at an outer end thereof.

13. The water container of claim 12, the bucket having a handle mounted at or adjacent to a top thereof, the handle being movable between an extended position and a retracted position.

14. The water container of claim 1, said container being a bucket.

15. The water container of claim 1, the outlet opening having a portion extending outwardly of said container and located at or adjacent to a top of said container, the water container further comprising:
- a drain hose connected to the portion of the outlet opening, said drain hose adapted to pass water from said container toward a desired drain area.

16. A water dispenser for poultry, the water dispenser comprising:
- a container having an inlet opening and an outlet opening, the inlet opening positioned at a level below a level of the outlet opening, the inlet opening having a portion extending outwardly of an exterior of said container, the portion of the inlet opening having a connection for a water hose formed exterior of said container;
- a nozzle affixed to the inlet opening, said nozzle positioned adjacent a bottom of said container, said nozzle adapted to direct an unobstructed pressurized flow of water toward the bottom of said container so as to pressure wash, clean and remove debris from the interior of said container; and
- a nipple affixed to said container, said nipple adapted to allow poultry to access water from the interior of said container.

17. The water dispenser of claim 16, said nipple positioned on said container in a location between the inlet opening and the bottom of the outlet opening.

18. The water dispenser of claim 17, said nipple comprising a plurality of nipples arranged circumferentially around an exterior of said container.

19. The water dispenser of claim 16, said nipple comprising:
- a valve seat;
- a stem extending through said valve seat so as to have an end positioned outwardly of said valve seat; and
- a valve cap affixed to said valve seat, said valve cap having a diaphragm therein, an opposite end of said stem bearing against the diaphragm such that when the end of said stem is contacted by a beak of a poultry, the diaphragm moves so as to release water through the valve cap and outwardly of said valve seat.

* * * * *